United States Patent
Chen et al.

(10) Patent No.: US 9,635,180 B2
(45) Date of Patent: Apr. 25, 2017

(54) SYSTEM FOR MANAGING WAIT QUEUES IN A HIGH VOLUME SYSTEM

(75) Inventors: Ying Chen, Raleigh, NC (US); Joel Duquene, Raleigh, NC (US); James P. Eberwein, Raleigh, NC (US); Dong K. Lieu, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1375 days.

(21) Appl. No.: 12/120,567

(22) Filed: May 14, 2008

(65) Prior Publication Data

US 2009/0285380 A1 Nov. 19, 2009

(51) Int. Cl.
*H04M 3/52* (2006.01)
*H04M 3/523* (2006.01)

(52) U.S. Cl.
CPC .. *H04M 3/5231* (2013.01); *H04M 2203/2072* (2013.01)

(58) Field of Classification Search
USPC .......................... 379/210.01, 265.02, 265.09
See application file for complete search history.

(56) References Cited

U.S. PATENT DOCUMENTS

| | | | |
|---|---|---|---|
| 4,953,204 A | 8/1990 | Cuschleg, Jr. et al. | |
| 5,311,574 A | 5/1994 | Livanos | |
| 7,174,011 B2 | 2/2007 | Kortum et al. | |
| 7,415,417 B2 * | 8/2008 | Boyer | G06Q 30/016 705/346 |
| 8,155,297 B1 * | 4/2012 | Dhir | H04M 3/42195 379/210.01 |
| 2003/0105827 A1 * | 6/2003 | Tan et al. | 709/206 |
| 2003/0115288 A1 * | 6/2003 | Ljubicich | H04L 29/06 709/219 |
| 2003/0206619 A1 * | 11/2003 | Curbow et al. | 379/210.01 |
| 2004/0008832 A1 * | 1/2004 | Mashimo et al. | 379/210.01 |
| 2004/0235520 A1 * | 11/2004 | Cadiz et al. | 455/557 |
| 2005/0262164 A1 * | 11/2005 | Guiheneuf | G06Q 10/109 |
| 2006/0126818 A1 * | 6/2006 | Berger et al. | 379/265.09 |
| 2006/0167729 A1 * | 7/2006 | Rafter | G06Q 10/00 705/7.16 |
| 2006/0178918 A1 * | 8/2006 | Mikurak | G06Q 10/06 705/7.25 |
| 2006/0285533 A1 * | 12/2006 | Divine et al. | 370/352 |

(Continued)

*Primary Examiner* — Joseph J Nguyen
(74) *Attorney, Agent, or Firm* — Steven M. Greenberg, Esq.; CRGO Law

(57) ABSTRACT

Embodiments of the present invention address deficiencies of the art in respect to call center wait queue management and provide a novel and non-obvious method, system and computer program product for call-back reservation services in a remote call center computing environment. In an embodiment of the invention, a call-back reservation method can be provided. The method can include receiving a telephone call to a remote call center from a caller, informing the caller of a reservation options menu, calculating multiple reservation time-slots to accommodate the caller's schedule, such that the reservation time is based on caller's personal preference, assigning a call-back reservation token to the caller, disconnecting the caller from the remote call center, and providing the caller with access to a remote call center agent at the reservation time when the caller reconnects to the remote call center.

13 Claims, 2 Drawing Sheets

(56) References Cited

U.S. PATENT DOCUMENTS

| | | | |
|---|---|---|---|
| 2007/0083400 A1* | 4/2007 | Katz | G06Q 10/02 |
| | | | 705/5 |
| 2007/0121829 A1* | 5/2007 | Tal et al. | 379/93.09 |
| 2008/0046531 A1* | 2/2008 | Shtivelman et al. | 709/206 |
| 2008/0076395 A1* | 3/2008 | Bhatia | H04M 3/42365 |
| | | | 455/413 |
| 2008/0107250 A1* | 5/2008 | Peuziat et al. | 379/142.01 |
| 2008/0263460 A1* | 10/2008 | Altberg | G06Q 30/02 |
| | | | 715/757 |
| 2009/0110162 A1* | 4/2009 | Chatterjee | H04M 3/42068 |
| | | | 379/93.23 |

\* cited by examiner

SYSTEM FOR MANAGING WAIT QUEUES IN A HIGH VOLUME SYSTEM

BACKGROUND OF THE INVENTION

Field of the Invention

The present invention relates to the field of call center computing environments and more particularly to wait queue management of call center computing environments.

Description of the Related Art

Providing quality telephone-based customer service plays an increasingly important role in today's competitive business environment. For organizations having a remote call center involved in activities requiring direct communication with an agent, improving wait times for customers on hold greatly contributes to customer satisfaction. A call center can be seen from an operational point of view as a queueing network. The call center is typically served by an automatic call distributor (ACD). In an ACD system, calls incoming to a call center are dealt with by a plurality of agents. The ACD system identifies the call type of each incoming call and either connects the caller to an available agent or puts the caller into a call queue.

Call queueing plays an important role in call center operations. Calls can be placed in different queues based on pre-established criteria, and are usually placed in each queue on a first-come-first-serve basis. The more callers waiting in the queue, the longer the wait time. Unfortunately, in such situations, callers often get frustrated and end up abandoning their calls or exchanging hostile words with an agent who eventually processes the call, resulting in loss of goodwill, and customer dissatisfaction.

U.S. Pat. No. 5,311,574 describes an automatic customer call back for ACD systems. This invention provides a method for adding the calling number in a queue so that the customer can be called back when the next agent becomes available. Being able to call back the caller certainly eliminates waiting on hold, however the automatic call back may occur at an inconvenient time for the customer since there is no option allowing the customer to choose a time slot that the agent should call back.

U.S. Pat. No. 5,946,388 describes a system that allows callers to exercise control over their rank order within a phone queue. An interactive voice response unit (IVRU) is employed to offer a caller a chance to move up in the queue in return for a payment. If the caller wishes to accept the offer, the caller responds by using the touch tone keys of his/her telephone and entering a credit card number, or indicating some other method of payment. The ACD then changes the rank order of the caller's call within the phone queue and alters the rank position of other calls within the queue, accordingly. While this invention is useful for reducing wait times in exchange for payment, it does not solve the fact that the caller must remain on the phone, in the queue until an agent is available.

Additional methods for reservation options include the Apple Genius Bar website service in which a customer can select a time slot on Apple's website for a technical support appointment. Being able make an appointment with a technical support specialist saves time. In this instance, the experience of the customer can be improved, however it does not solve the fact that the customer must physically still take the product to the Apple store. This method would not work if a remote call center is located overseas.

There is currently a need for having a customer service reservation system that enables the customer to connect to a remote call center at a time convenient for the customer without having to remain on hold to access a call center agent.

BRIEF SUMMARY OF THE INVENTION

Embodiments of the present invention address deficiencies of the art in respect to call center wait queue management and provide a novel and non-obvious method, system and computer program product for call-back reservation services in a remote call center computing environment. In an embodiment of the invention, a call-back reservation method can be provided. The method can include receiving a telephone call to a remote call center from a caller, informing the caller of a reservation options menu, calculating multiple reservation time-slots to accommodate the caller's schedule, such that the reservation time is based on caller's personal preference, assigning a call-back reservation token to the caller, disconnecting the caller from the remote call center, and providing the caller with access to a remote call center agent at the reservation time when the caller reconnects to the remote call center.

The method of calculating multiple reservation time-slots can further provide personal reservation services by retrieving calendar information for said caller through a data communications network linkage coupled to at least one reservation subscriber database disposed in a switch in a public switched telephone network (PSTN). Furthermore, the method can include an additional re-scheduling option for an existing reservation.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for a call-back reservation service. In accordance with an embodiment of the present invention, a caller on-hold can book a reservation through an IVR system to have access to a call center agent at the time of his/her given appointment. The caller can elect to either call the call center back, or have an agent call-back instead. Either way, the call-back reservation service provides through an IVR system the caller with a set of multiple reservation time-slots based on accommodating the caller's personal schedule. The caller can upload calendar information to the call center through a data communications network so that the call center can determine reservation time-slots more favorable to both the caller's personal schedule and the call center's capacity to serve. Thus, when a caller calls back as a reservation holder, the caller is transferred to an available agent at the caller's reservation time. Notably, the caller has an additional option to reschedule the call-back reservation to another time-slot favorable to the caller.

Figure 1:
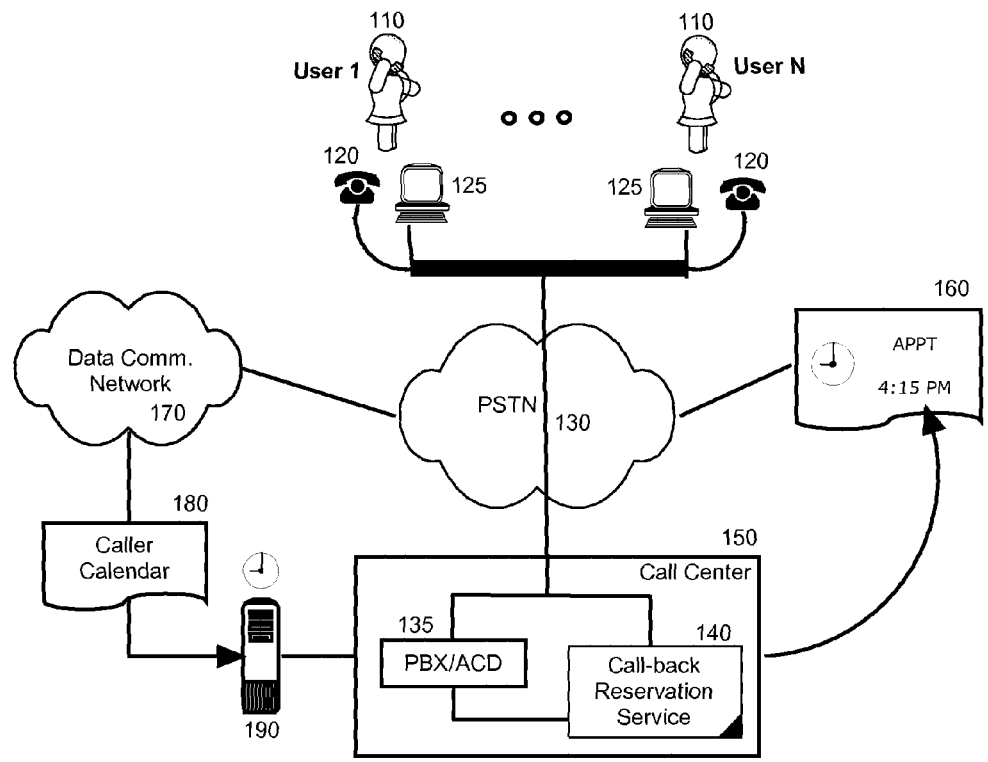
FIG. 1 is a schematic illustration of a system for call-back reservation services using caller calendar information acquired from the caller within a PSTN.

In further illustration, FIG. 1 is a schematic illustration of a system for call-back reservation service using a caller's calendar information to help in determining what time is more favorable to both the caller and the system. A call-back reservation or appointment can include an available reservation time-slot giving priority access to an available call center agent when the caller calls back at the time of his/her appointment. Specifically, one or more callers 110 places a call via caller's telephone 120, or computer network 125 incorporating an existing public telephony network 130 such as a PSTN or VoIP network. The call is routed through the public network 130 to a private call switching network 135 such as a PBX or ACD of a remote call center 150.

Once a call has been initiated and determined that there are no immediate available agents, the call-back reservation service 140 can present multiple reservation times to the caller 110 by either utilizing caller calendar information 180 uploaded through a data communications network 170 or stored in a reservations database 190. Alternatively, if there is no calendar information available, then the system can determine an available time according to caller preference. The caller can elect to either call the call center 150 back at the exact appointment time 160 given, or have a call-back initiated by an agent at the exact appointment time 160 given to the caller.

Figure 2A:
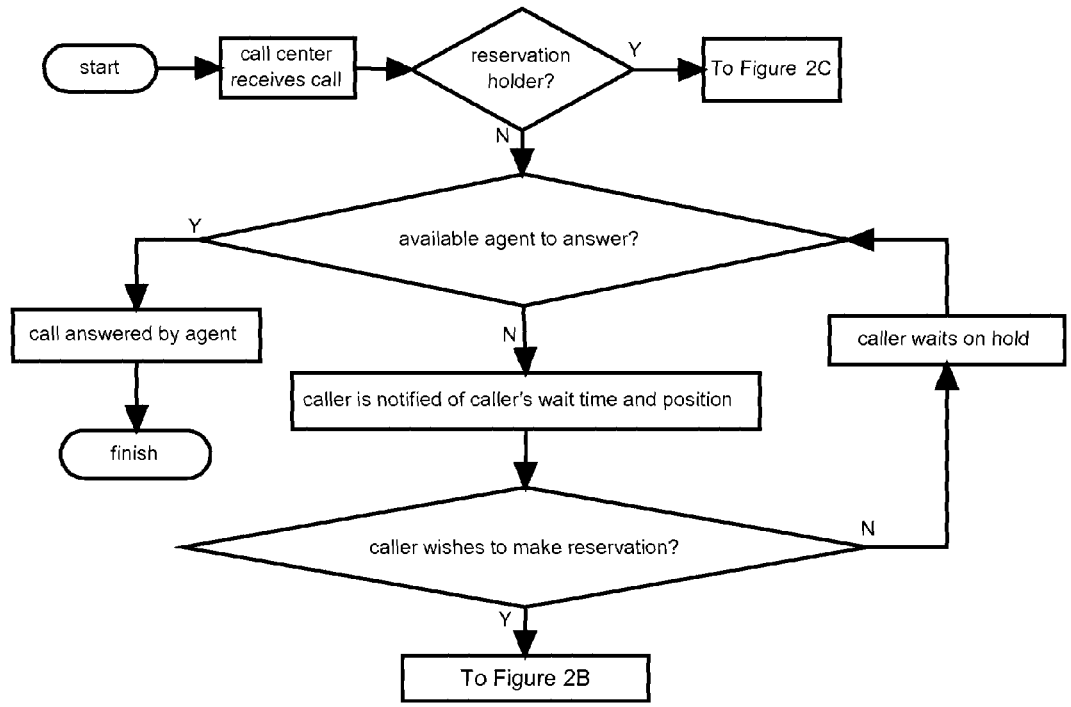
FIGS. 2A, 2B and 2C are flow charts illustrating a process for call-back reservation services in the system of FIG. 1.

To further illustrate the preferred embodiments of the present invention, FIG. 2A is a flow chart illustrating a process for call-back reservation services in the system of FIG. 1. In step 210 when a call center receives a call from a caller, the system determines if that caller is a reservation holder 220. If the caller is a reservation holder then the system proceeds to FIG. 2C indicated in step 290 which is disclosed below. If the caller is not a current reservation holder, then the system determines whether an available agent is free to answer the call in decision step 230. If there is an available agent then in step 240 the call is answered by the agent. If no free agents are available then the caller is notified of the caller's wait time and current queue position in step 250. If the caller is faced with a long hold time, the caller has an opportunity to make a reservation so that either the call center can call back or the caller may initiate a call-back to the call center in order to access an agent at the exact appointment time requested by the caller.

According to decision step 260, if the caller chooses to make a reservation, the system proceeds to FIG. 2B in step 270 which is disclosed below on how the reservation process is implemented. If the caller doesn't want to make a future reservation then the caller can wait on hold in step 280 until an available agent answers the caller.

Figure 2B:
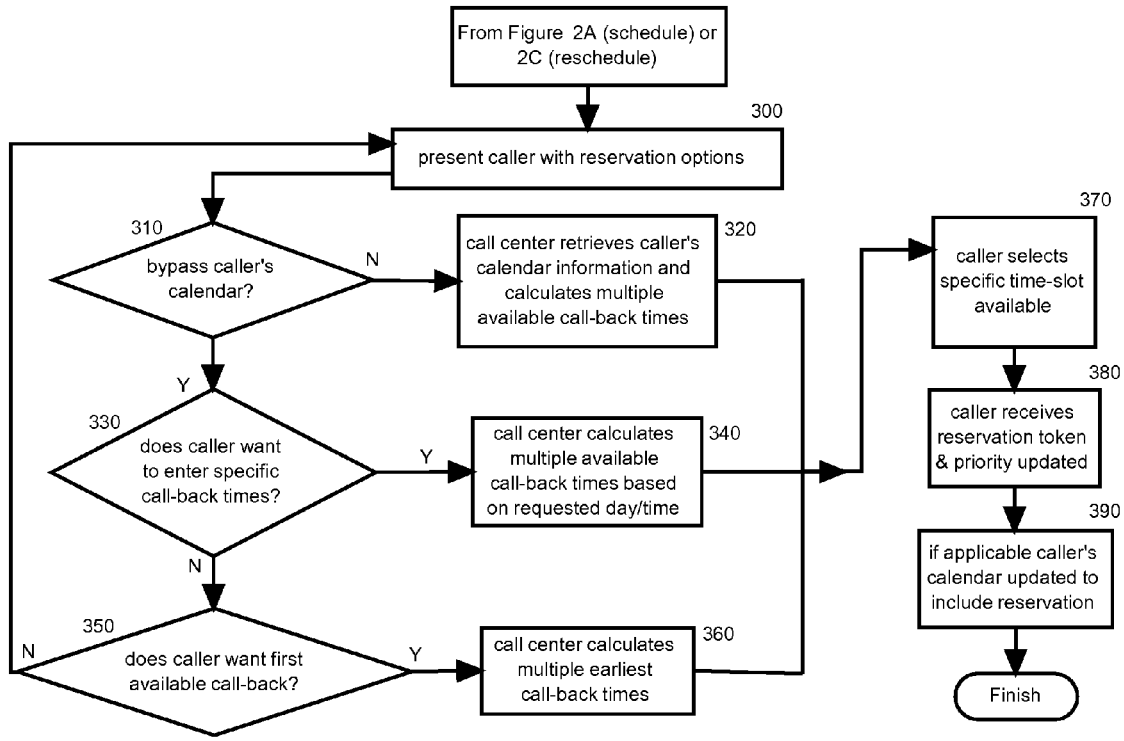
Figure 2C:
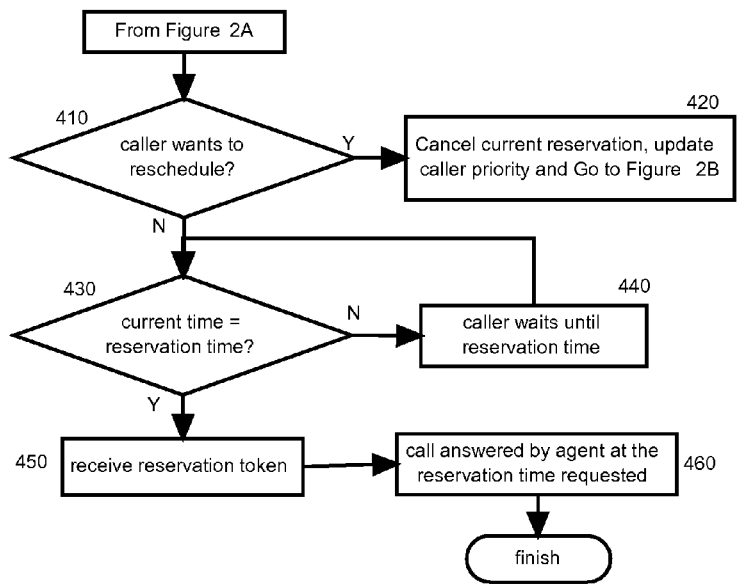

FIG. 2B, continuing from FIG. 2A or 2C, is a flow chart illustrating a process for call-back reservation and also re-scheduling services in the system of FIG. 1. Call-back reservation services can include for first-time reservers and also for callers who would like to re-schedule their appointments as discussed in FIG. 2C. Whether the caller elects a new reservation or wants to reschedule an existing reservation, step 300 presents the caller with reservation options menu. In decision step 310, if the caller wants to incorporate the caller's calendar information to allow the system to present available time-slots based on the caller's calendar then the call center retrieves the caller's calendar information in step 320 and calculates multiple call-back times. Notably, the caller could have already been a registered customer and have already uploaded caller's calendar. Alternatively, the caller even if unregistered to the system, can upload calendar information through a data communications network so the call center can access the calendar information from the reservations database 190.

If the caller prefers to bypass caller's calendar, then in decision step 330, the system asks the caller whether they want to enter a specific call-back period. The specific call-back period can be selected according to time categories such as morning, afternoon, night as well as specific time blocks or other dates in the future. In step 340, the call center receives the specific time period requests and calculates multiple available call-back times based on the caller's preferred time period entered.

If the caller does not want to enter a specific time period, then in decision step 350, the system asks the caller whether they prefer to take the first/earliest call-back time. The first/earliest call-back time can be calculated according to current software systems. If the caller doesn't wish to elect an earliest call-back time either, then the system takes the caller back to step 300, presenting the caller with the reservation options menu in which the caller can either select a reservation option or exit from the reservation menu. If the caller wants to set up an appointment for the earliest call-back time, then in step 360 the call center calculates multiple earliest call-back times.

After the call center has calculated and presented the caller with available time-slots in either step 320, 340 or 360, the next step is for the caller to select a specific time-slot in step 370. The caller is then given a reservation token in step 380 and chooses whether to have an agent call back or the caller initiate a call-back. The reservation token may be any type of pin #, password, or even a different customer service priority telephone number. If applicable from step 320, the system will additionally update caller's calendar to include the specific reservation time in step 390.

FIG. 2C, continuing from FIG. 2A, is a flow chart illustrating a process for call-back reservation and re-scheduling services in the system of FIG. 1. Assuming that the caller has called the call center and the system has determined the caller is a current reservation holder (See FIG. 2A), then in decision step 410, the system asks the caller for if the caller wishes to re-schedule their reservation. If the caller wants to re-schedule, then the system cancels the current reservation in step 420 and goes back to FIG. 2B to present the caller with reservation options menu in step 300. From thereon, the reservation process takes place similar to what was disclosed above for FIG. 2B. token. If the caller wishes to proceed on with caller's current reservation, then in decision step 430, the system determines whether the caller has called on-time. If the caller has called earlier than his reservation time-slot, then in step 440, the caller waits until the current time matches the reservation-time. When the current time matches the reservation time, then in step 450, the caller enters the reservation token which can include a pin # or password, and in step 460, an available agent answers the caller at the time of the reservation.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A call-back reservation method comprising:
receiving a reservation request from a caller to an interactive voice response (IVR) system of a call center comprising a private call switching network in which a multiplicity of different call center agents receive telephone calls in a single location from multiple different callers in multiple different locations;
uploading to the call center from the caller a calendar for the caller;
determining by a call-back reservation service coupled to the IVR system of the call center a set of available reservation time-slots based both upon a capacity of the call center to place telephone calls by an available one of the agents in the call center at a particular time and also the uploaded calendar of the caller;
prompting the caller by the IVR system to select a reservation time-slot from the determined set of reservation time-slots;
assigning by the IVR system the selected reservation time-slot to the caller;
assigning by the IVR system a reservation token including one of a pin, a password, and a telephone number to the caller upon assigning the selected reservation time-slot to the caller; and,
establishing a call between the caller and a call center agent at a time of the assigned selected reservation time-slot; wherein establishing the call between the caller and the call center agent at the time of the assigned selected reservation time-slot, comprising:
receiving, at the call center, the call from the caller;
determining whether the caller has called at the time of the assigned selected reservation time-slot; and,
upon determining that the caller has called before the time of the assigned selected reservation time-slot, having the caller wait until the assigned selected reservation time-slot.

2. The method of claim 1, further comprising audibly playing back to the caller a reservation options menu and allowing the caller to input caller's personal preference for the reservation time-slot.

3. The method of claim 2, wherein the reservation options menu further comprises a re-scheduling reservation option, wherein the caller replaces the assigned selected reservation time-slot with a new reservation-time slot.

4. The method of claim 1, further comprising extracting the caller's calendar from a reservations database and calculating a set of reservation time-slots that do not conflict with the caller's existing appointments in the caller's calendar extracted from the reservations database.

5. The method of claim 1, further comprising disconnecting the caller from the remote call center and providing the caller with access to a remote call center agent at the reservation time when the caller reconnects to the remote call center.

6. The method of claim 1, further comprising receiving a requested specific time period from the caller and calculating multiple reservation time-slots based on the requested specific time period.

7. The method of claim 1, further comprising inserting into the caller's calendar the assigned selected reservation time-slot.

8. The method of claim 1, wherein establishing the call between the caller and the call center agent at the time of the assigned selected reservation time-slot, comprising:
receiving, at the call center, the call from the caller;
determining whether the caller has called at the time of the assigned selected reservation time-slot;
upon determining that the caller has called at the time of the assigned selected reservation time-slot, receiving the reservation token; and,
establishing the call between the caller and the call center agent.

9. A data processing system for call-back reservation services of a remote call center, the data processing system comprising:
a remote call center comprising a private call switching network in which a multiplicity of different call center agents receive telephone calls in a single location from multiple different callers in multiple different locations;
a reservation subscriber database containing caller calendar information and assigned caller reservation time-slots;
a processor of a computer of the remote call center in which an interactive voice response (IVR) system executes and in which a callback reservation service coupled to the IVR system uploads a calendar for a caller from the caller into the database and calculates a set of available reservation time-slots based both upon a capacity of the call center to place telephone calls by an available agent in the call center at a particular time and also the uploaded calendar of the caller; and, a call-back reservation service logic executing in the computer of the remote call center, the call-back reservation service logic, which when executed causes the computer of the remote call center to receive a reservation request from a caller, prompt the caller to select from a reservation time-slot from the set of available reservation time-slots, assign selected reservation time-slot to the caller, assign a reservation token including one of a pin, a password, and a telephone number to the caller upon assigning the selected reservation time-slot to the caller, and establish a call between the caller and the call center agent at a time of the assigned selected reservation time-slot; wherein the call-back reservation service logic, which when executed causes the computer of the remote call center to establish the call between the caller and the call center agent at the time of the assigned selected reservation time-slot comprises call-back reservation service logic, which when executed causes the computer of the remote call center to:

receive, at the remote call center, the call from the caller;

determine whether the caller has called at the time of the assigned selected reservation time-slot; and, upon determining that the caller has called before the time of the assigned selected reservation time-slot, have the caller wait until the assigned selected reservation time-slot.

10. The system of claim 9, wherein the call-back reservation service logic, which when executed causes the computer of the remote call center to receive the reservation request from the caller comprises call-back reservation service logic, which when executed causes the computer of the remote call center to:

receive a telephone call through an interactive voice response (IVR) system, and;

identify the caller through the IVR system.

11. The system of claim 9, wherein the caller's calendar is sent to the remote call center through a data communications network linkage coupled to the reservation subscriber database disposed in a switch in a public switched telephone network (PSTN), wherein the caller's calendar is identified by a username associated with the caller.

12. The system of claim 9, wherein the call-back reservation service logic further comprises all-back reservation service logic, which when executed causes the computer of the remote call center to insert into the caller's calendar the assigned selected reservation time-slot.

13. The system of claim 9, wherein the call-back reservation service logic, which when executed causes the computer of the remote call center to establish the call between the caller and the call center agent at the time of the assigned selected reservation time-slot comprises call-back reservation service logic, which when executed causes the computer of the remote call center to:

receive, at the remote call center, the call from the caller;

determine whether the caller has called at the time of the assigned selected reservation time-slot;

upon determining that the caller has called at the time of the assigned selected reservation time-slot, receive the reservation token; and, establish the call between the caller and the call center agent.

* * * * *